(12) United States Patent
Barbosa et al.

(10) Patent No.: US 7,395,858 B2
(45) Date of Patent: Jul. 8, 2008

(54) PROCESS FOR THE SELECTIVE CONTROLLED REDUCTION OF THE RELATIVE WATER PERMEABILITY IN HIGH PERMEABILITY OIL-BEARING SUBTERRANEAN FORMATIONS

(75) Inventors: Luis Cesar Ferreira Barbosa, Rio de Janeiro (BR); Sérgio Luiz Pereira de Freitas Coelho, Niterói (BR); Priscila Moczydlower, Rio de Janeiro (BR); Geraldo Maria Ramos de Godoy, Rio de Janeiro (BR); Edson de Souza Leite, Petröpolis (BR)

(73) Assignee: Petroleo Brasiliero S.A. _ Petrobras (BR)

( * ) Notice: Subject to any disclaimer, the term of this patent is extended or adjusted under 35 U.S.C. 154(b) by 58 days.

(21) Appl. No.: 11/602,184

(22) Filed: Nov. 21, 2006

(65) Prior Publication Data

US 2007/0062697 A1 Mar. 22, 2007

(51) Int. Cl.
*E21B 33/138* (2006.01)
*E21B 43/32* (2006.01)

(52) U.S. Cl. .................. 166/263; 166/291; 166/300; 166/371

(58) Field of Classification Search ............... None
See application file for complete search history.

(56) References Cited

U.S. PATENT DOCUMENTS

| | | | |
|---|---|---|---|
| 4,172,066 A | | 10/1979 | Zweigle et al. |
| 4,617,132 A | * | 10/1986 | Dalrymple et al. .......... 523/130 |
| 6,474,413 B1 | | 11/2002 | Barbosa et al. |
| 6,516,885 B1 | | 2/2003 | Munday |
| 6,579,909 B1 | | 6/2003 | Chauveteau et al. |
| 7,207,387 B2 | * | 4/2007 | Eoff et al. .................... 166/291 |
| 2004/0171495 A1 | | 9/2004 | Zamora et al. |
| 2004/0229756 A1 | | 11/2004 | Eoff et al. |

OTHER PUBLICATIONS

Di Lullo et al; "New Insights into Water Control—A Review of the State of the Art"; Society of Petroleum Engineers International; SPE 77963; 2002; pp. 1-10.

Chauveteau et al; "Controlling Gelation Time and Microgel Size for Water Shutoff"; Society of Petroleum Engineers International; SPE 59317; 2000; p. 8.

(Continued)

*Primary Examiner*—Zakiya W. Bates
(74) *Attorney, Agent, or Firm*—Nixon & Vanderhye PC (57) ABSTRACT

A process for the selective controlled reduction of the relative water permeability in high permeability, oil-bearing formations, with negligible reduction of the permeability to oil. The process comprises, for sandstone reservoir rocks, a first layer of cationic polymer, followed by a brine spacer slug and a second polymer layer made up of a suspension of anionic polymer and an anionic or non-ionic microgel, optionally this configuration being repeated. As a result the thickness of the polymer layer is considerably increased, which permits the process to be used in high permeability formations. For limestone rocks the first layer is made up of anionic polymer, while the second layer involves a suspension of cationic polymer/cationic or non-ionic microgel. The polymers are all injected as aqueous suspensions in brine or seawater.

17 Claims, 2 Drawing Sheets

OTHER PUBLICATIONS

Chauveteau et al; "New Size-Controlled Microgels for Oil Production "; Society of Petroleum Engineers International; SPE 64988; 2001; pp. 1-8.

Chauveteau et al; "In-Depth Permeability Control by Adsorption of Soft Size-Controlled Microgels"; Society of Petroleum Engineers International; SPE 82228; 2002; pp. 1-8.

* cited by examiner

PROCESS FOR THE SELECTIVE CONTROLLED REDUCTION OF THE RELATIVE WATER PERMEABILITY IN HIGH PERMEABILITY OIL-BEARING SUBTERRANEAN FORMATIONS

FIELD OF THE INVENTION

The present invention relates to the field of the processes for the reduction of relative permeability to water in oil-bearing subterranean formations, more specifically, to processes for the selective and controlled reduction of the relative water permeability in high permeability, oil-bearing subterranean formations.

BACKGROUND INFORMATION

One drawback of the oil companies over the world is the production of water associated to oil. Premature breakthrough of formation or injection water and the rise in water production from then on results in accelerated decline of oil production, with increased pumping operation costs, treatment and discarding of huge volumes of water.

Water production reaches such amounts that it can be said that actually oil companies are water companies, since for an oil production of 75 million barrels oil per day (BPD), 300-400 million barrels of water are produced. This means 5-6 barrels of water per barrel of oil, attaining 9 barrels of water per barrel of oil or even 50 barrels of water per barrel of oil.

Fluid properties required for the control of permeability and mobility of water flowing in a porous medium are the following: 1) be easily injected at a long distance from the treated well; 2) bear properties such that the fluid weakly interacts with the physical chemical conditions of the reservoir; 3) should contain colloids or polymer species that are able to be adsorbed on several kinds of reservoir rocks for the formation of layers of controlled thickness; such layers should be hydrated in the presence of water and dehydrated in the oil phase; 4) such layers should be kept stable for long periods under the physical chemical reservoir conditions.

As cited in the paper SPE 77963 "New Insights into Water Control—A Review of the State of the Art" by Gino di Lullo e Phil Rae, water production in an oil well brings a collection of problems such as scale in susceptible wells, induction of fines migration or sandface failure, increased corrosion in tubulars, and killing of wells by hydrostatic loading. Thus, in spite of the fact that water production is an unavoidable consequence of oil production, it is usually desirable to defer its onset, or its rise, for as long as possible.

Water cuts in oil producing wells increases as the oil fields become mature. The source of the water is either formation water (aquifers) or injected water used for reservoir pressure maintenance purposes. In addition, heterogeneities encountered in reservoir rocks can cause water channeling through higher permeability streaks/hairline fractures (natural or induced) and/or near wellbore water coning due to the proximity of the well with the water-bearing zone, high rock vertical permeability, or high pressure differentials between the well and the formation normally caused by a limited reservoir thickness or excessive pressure drawdowns.

No matter the context, the origin of the problem is nearly always associated to a higher mobility of water relative to that of oil. Normally the lower the API degree of oil, the higher the possibility of premature water production, since low gravity oils are typically much more viscous, and hence have lower mobility.

The control of water production has obtained a limited success through the use of several gel-forming systems.

Three main chemical-based treatments are known.
Permeability Blockers or gellants;
Disproportionate Permeability Reducers and/or Selective Permeability Blockers; and;
Relative Permeability Modifiers (RPM).

Permeability Blockers:

As the name indicates, these products block or plug the pore spaces so as to hinder the movement of fluid, normally by means of a controlled, delayed chemical reaction that allows deep injection of the material before it reacts to form a three dimensional gel. Well-known examples of these processes are those involving sodium silicate solutions, internally activated with urea esters or aminoplast resins.

Other options include resins, latex or polymer solutions that gel up in response to temperature, salinity or pH to form coagulated precipitates or three dimensional gels, such as those created by latex or phenolic resins. The best-known systems are based on polyacrylamide crosslinked with chromium and PVA crosslinked with glutaraldehyde.

These products are not selective and they plug pores containing oil and/or water, thus requiring other procedures to avoid plugging off the oil-producing zone.

Selective Permeability Blockers

These products also plug the pore spaces, restricting fluid movement. However, due to their partial solubility in oil, precipitation, swelling or viscosifying is more reduced in the presence of hydrocarbons than in a water environment. The net effect is a reduction of water relative permeability by a larger factor than that to oil. Preferred products for use with water-based fluids (WBM) are rosin wood derivatives that form a colloidal precipitate that agglutinates, forming a gelatinous mass in the presence of water. Products for oil-based fluids (OBM) include tetramethyl orthosilicate (TMOS) and ethyl silicate that react in the presence of water to form a rigid silica gel.

There are also new systems based on viscoelastic anionic surfactant (VAS), designed for water control purposes. Such systems produce extremely shear thinning gels in the presence of cations. Such gels can easily permeate porous and permeable rocks, which allows to pump and inject them in the reservoir at full viscosity and higher matrix rates (below fracturing pressure). Once in the formation pores, the viscosity of such gels could increase as high as 100 times, thereby restricting fluid movement. The chemistry of such systems is such that hydrocarbons break them on contact and they revert to the base brine viscosity. This frees up only the pores with residual hydrocarbon saturation, leaving them clear and strongly water-wet. Highly water-saturated pores keep plugged with a high viscosity gel.

Relative Permeability Modifiers (RPM)

These are water-soluble, hydrophilic polymer systems that, when hydrated, produce long polymer chains that, in the rock, will loosely occupy the pore spaces. Being strongly hydrophilic, they attract water and repel oil and as a net result they exert a drag force on water flow in the pores, with a minimal and sometimes positive effect on oil flow.

Useful polymers for this purpose include high molecular weight polyacrylamides and more recently, scleroglucans. However, temperature limitations, shear sensitivity and poor tolerance to calcium and magnesium ions undermine their effectiveness, as they are produced back faster than expected by formation fluids.

Charged radicals have been added to polyacrylamides (poly-DMDAAC) improving their shear sensitivity, temperature and salt tolerance as well as their adhesion to rock.

Ideally, RPM systems should be aqueous solutions or suspensions, the features of which such as concentration and physical chemical properties should be adjusted to the formation permeability, among other parameters. RPMs provide a resistance (drag) to water flows in the order of 2 to 100 times and a detrimental drag to oil ideally lower than 2. Environmental changes such as pH, salinity or drawdown pressure will affect the effectiveness and durability of the treatment. Thus, post job interventions will most probably destroy, partially or completely, their water controlling properties.

SPE Paper 8228 "In-Depth Permeability Control by Adsorption of Soft Size-Controlled Microgels" by G. Chauveteau et al reports that the injection of stable, pre-formed microgels as relative permeability modifiers to reduce the permeability to water minimizes the risk of well plugging or the absence of efficiency inherent to a technology based on in-situ gelling. Recent investigations showed that microgels formed by crosslinking a polymer solution under shear are soft, size-controlled, and quasi-insensitive to reservoir conditions, stable over long periods of time and can control in-depth permeability by adsorbing onto all kinds of rock surface. The results shown in said paper are aimed at knowing how to control the kinetics of crosslink formation by ionic strength and at determining the role of the interactions between microgels on their propagation in porous media. Experiments include gelling tests at different ionic strengths, measurements of viscoelastic properties of solutions, determination of both microgel density and microgel-microgel interaction parameter for different stabilization conditions, and the relation between the interaction parameter and the mode of adsorption of microgels. Partly attractive microgels adsorb by forming multilayers and thus promote drastic permeability barriers. Fully repulsive microgels adsorb as monolayer and propagate easily in porous media at long distances, depending only on the quantity of microgel injected. Thus, by controlling both gelling and stabilization processes, microgels can be produced to be either diversion agents or disproportionate permeability reducers to control water permeability at long distances from the wells.

SPE paper 64988 "New Size-Controlled Microgels for Oil Production", by G. Chauveteau et al., reports that microgels formed by polymer crosslinking under shear flow are very promising for several applications in oil production. The proper polymer/crosslinker system and under the conditions needed to obtain the desired properties provides quasi-ideal products. Such products are expected to control water mobility at long distances from the wells to improve sweep efficiency and reduce selectively permeability to water for water production control. This paper reports experiments related to the theoretical understanding of the crosslinking process under shearing and tests the microgels in porous media. Several microgel positive properties are reported.

SPE paper 59317 "Controlling Gelation Time and Microgel Size for Water Shutoff", by G. Chauveteau et al., describes experiments designed to assess and control both size and conformation of microgels formed under constant shear flow. The reported studies indicate that the crosslinking species may be dimers, tetramers and associations of tetramers according to pH and Zr concentration in presence of lactate. Microgels formed in diffusion regime are isotropic and their size is significantly reduced as shear rate increases, while when formed in correction regime they are anisotropic and their size decreases negligibly with shear rate. Since experimental data are in agreement with such model, it is possible to design the microgel preparation as a function of its role in the aimed application, either relative permeability modifiers for water shut-off or viscosity enhancers for polymers flooding.

US Application 2004/0229756 relates to methods and solutions for treating water and hydrocarbon-producing formations for reducing the permeability to water thereof. The proposed solutions comprise a reactive hydrophilic polymer, a hydrophobic compound capable of reacting with the polymer in situ, and a surfactant. Solutions are prepared and injected in the formation followed by shutting-in the formation in order to permit reaction between the polymer and the hydrophobic compound. The reaction product attaches to adsorption sites on surfaces within the porosity of the formation and reduces the water permeability thereof without substantially reducing the hydrocarbon permeability thereof. The hydrophilic reactive polymer is selected among the group consisting of polyethylene imine, polyvinyl amine, poly(vinylamine/vinyl alcohol), chitosan, polysyline and alkyl acrylate polymers.

US Application 2004/0171495 teaches a method of reducing the water permeability of a well bore during the drilling phase, comprising: providing a polymer comprising: (i) a monomer selected from the group consisting of alkyl acrylates, alkyl methacrylates, alkyl acrylamides, alkyl methacrylamides, alkyl dimethylammoniumethyl methacrylate halides, and alkyl dimethylammonium propylmethacrylamide halides, wherein the alkyl groups have from about 4 to about 22 carbon atoms; and (ii) a monomer selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide and hydroxyethyl acrylate; and placing the polymer down hole, thereby reducing the water permeability of the well bore.

U.S. Pat. No. 6,579,909 relates to a method for preparing microgels of controlled size. According to the method, a gelling composition comprising a polymer and a crosslinking additive intended for the polymer is injected into a porous and permeable medium, and a monodisperse solution of microgels of substantially constant size is recovered at the outlet. The invention also relates to an application of the method for reducing the permeability of porous and permeable formations of reservoir rock type.

U.S. Pat. No. 6,516,885 describes that water shut-off is provided in a hydrocarbon well by injecting a first chemical composition, effective as a relative permeability modifier polymer, into the hydrocarbon and a water zone of the well followed immediately by the injection of a second chemical composition, which forms a flow blocking polymer composition, into the zones and, after a shut-in period for reaction of the relative permeability modifier polymer, back producing the polymer compositions from their hydrocarbon zones to provide a path for the hydrocarbons from the zones while allowing the flow blocking polymer compositions to form the water shut-off in the water zones. The hydrocarbon to which the process is applied is a gas. The first composition comprises a crosslinkable cationic polyacrylamide and the second chemical composition comprises a crosslinkable polyacrylamide-chromium acetate system.

U.S. Pat. No. 4,172,066 describes a composition, which comprises discrete, spheroidal microgels of a water-swellable polymer such as crosslinked polyacrylamide, useful for reducing the permeability of porous structures. Said microgels in the dry state have diameters less than about 20 micrometers, preferably lower than 4 micra, and still more preferably, lower than 1 micra, said polymer being sufficiently cross-linked to enable the microgels to remain as discrete spheroidal particles having diameters in the range from about 0.5 to about 200 micrometers, preferably between 1 and 10 micrometers when said microgels are dispersed in an aqueous fluid medium. In the partially water-swollen state the microgels contain at least 30% by weight of crosslinked polymer and up to 70% by weight of water. Useful monomers are the water-soluble ethylenically unsaturated amides such as acrylamide, methacrylamide and fumaramide, N-(diethylaminomethyl)methacrylamide and quaternized derivatives thereof, e.g., N-(trimethylammoniummethyl)acrylamide chloride; acrylic acid, methacrylic acid, itaconic acid, fumaric acid and the like; ethylenically unsaturated quaternary ammonium compounds such as vinylbenzyltrimethylammonium chloride.

U.S. Pat. No. 6,474,413, of the Applicant and hereby completely incorporated as reference teaches a process for the selective and controlled reduction of water permeability in oil-bearing formations made up of sandstone or limestone, the process comprising the injection of a slug of aqueous polymer solutions having a polarity opposite to the polarity of the rock, followed by the injection of a spacer slug of alkaline halide and then a fresh slug of polymer aqueous solution, the polarity of which is opposite to the polarity of the first polymer slug, and then a slug of aqueous solution of trivalent metal crosslinking agent to effect the partial crosslinking of the polymer charges, the polymer layers being successively added until the injection pressure of the polymer aqueous solutions show that the desired Residual Resistance Factor RRF has been attained, and well production may be resumed.

According to such process, spacer slugs consisting of an alkaline salt aqueous solution, such as a NaCl or KCl solution, always separate the polymer and crosslinking slugs. When the formation is rich in limestone rocks, initially an anionic polymer is injected, successively followed by cationic polymer slugs or multivalent crosslinking agent and anionic polymer slugs, the last layer being always made up of crosslinking agent. In this way the hydrophilic film formed bears an anionic character. All the polymer slugs are alternated with spacer slugs of an alkaline salt aqueous solution such as KCl. The process is useful for subterranean formations having permeability values of up to 3 Darcy.

The process described in said US patent is relatively cumbersome, since several polymer layers should be placed into the formation in order to reach the film thickness required for attaining the desired reduction in water permeability. On the contrary, in the present invention, the combined anionic polymer and controlled-particle size microgels used as second layer to be injected into the formation (in case of a sandstone formation) leads to the drastic reduction in the number of layers required for obtaining the desired RRF. This renders the present process more efficient, of lower cost and quicker to apply in the treatment of high permeability formations and high productivity wells. Besides, in the cited US reference the layered film forms a structure in the plane (two dimensional), while the present invention is directed to a structure forming a volume (three dimensional), where the microgel particles undergo hydration and dehydration according to their water or oil environment, in a reversible process.

Still, as cited on column 7, line 50 of the said U.S. Pat. No. 6,474,413, the process involves punctual crosslinking without gel formation, while in the present invention there is adsorption of the anionic polymer and also of the anionic microgel to the cationic layer, resulting in stronger/increased rigidity of the layer.

As compared to state-of-the-art processes using microgel only, an additional advantage of the invention results from combining anionic polymer and microgel besides the initial cationic polymer layer (for a sandstone formation), which provides better polymer adsorption to said initial layer. The net result is a rise in process efficiency due to lower polymer solution amounts to attain the desired effect of lower RRFw (Residual Resistance Factor) values.

Thus, when compared to state-of-the-art techniques—use of microgel only or the technique taught in U.S. Pat. No. 6,474,413—the process of the present invention provides potentialized results related to the FRRN ratio, those results not being described nor suggested in the cited known techniques.

Thus, in spite of the state-of-the-art developments, the technique is still in need of a selective process aimed at high productivity and high permeability fields using high molecular weight, seawater-soluble polymers combined to crosslinked acrylamide-based polymeric microgels, having a controlled particle size distribution for the reduction of relative water permeability in subterranean high permeability oil-bearing formations, while the permeability to oil is negligibly affected, such process being described and claimed in the present application.

SUMMARY OF THE INVENTION

Broadly, the process for the selective and controlled reduction of water permeability of high permeability oil-bearing subterranean formations and temperature up to 110° C. traversed by a well for the production of oil and/or gas comprises, for said well, the following steps:
a) Injecting a slug of a cationic polymer aqueous solution in the amount required for adsorption at a certain penetration radius in said subterranean formation, a portion of said aqueous solution creating a polymer adsorbed to the formation and containing free positive residual charges, while another portion remains non-adsorbed and can be displaced by successive brine and polymer/microgel slugs up to the required penetration radius;
b) Injecting a spacer slug of an aqueous brine solution, so as to displace said non-adsorbed portion of the slug of cationic polymer aqueous solution towards the interior of the formation, whereby will be separated the slug of cationic polymer solution already injected and the slug of anionic polymer/anionic or non-ionic microgel suspension to be injected;
c) Injecting a slug of anionic polymer and anionic or non-ionic microgel aqueous suspension in a sufficient amount to form a layer of anionic polymer and said microgel adsorbed to the cationic polymer layer already adsorbed to the subterranean formation rock;
d) Injecting a spacer slug of an aqueous brine solution for spacing the polymer slugs and displacing the slug of anionic polymer/anionic or non-ionic microgel aqueous suspension towards the interior of the formation;
e) If required, repeating the treatment sequence a), b) and c) until the injection pressure of the aqueous solution of step d) attains a value such as to reach the desired value of Residual Resistance Factor to water (RFFw);
f) Shut-in the well during the required period of time to finish the adsorption process among the layers; and
g) Resuming well production.

The invention provides thus a process for the selective and controlled reduction of the relative water permeability in high permeability oil-bearing subterranean formations, the process employing brine-soluble high molecular weight polymers and polymeric microgels from crosslinked polyacrylamide.

The invention provides still a process for the selective and controlled reduction of the relative permeability to water in high permeability oil-bearing subterranean formations, the process having a multi-layered configuration comprising the injection of polymer layers: one layer a cationic polymer and another, a mixture of anionic polymer and microgels, with repeated layers in the same sequence, as required.

The invention provides further a process for the selective and controlled reduction of the relative permeability to water in high permeability oil-bearing subterranean formations where the multi-layered configuration provides improved adsorption of the first layer with the rock and between the first and second polymer layers, such that the process application as a whole is improved.

The invention provides additionally a process for the selective and controlled reduction of the relative permeability to water in high permeability oil-bearing subterranean formations where the cationic and anionic polymers employed in the process are solubilized and suspended in brines such as seawater aiming at making possible the treatment of huge volumes so as to bypass drawbacks related to industrial water supplies in offshore platforms.

DETAILED DESCRIPTION OF THE PREFERRED MODES

The present invention relates to a selective process for the control of water permeability of oil-bearing subterranean formations aimed at high productivity and high permeability fields, the process being performed using seawater- or brine-soluble polymers. Such polymers are employed combined to crosslinked polyacrylamide-based polymeric microgels of controlled particle size distribution.

Broadly, the process for the reduction of the relative water permeability of the water production interval, in the reservoir area contiguous to any well bore, comprises introducing in the area to be treated a polymeric aqueous solution followed by a brine slug and a polymer/microgel suspension slug, said slugs being injected from said well bore. Later on the well is put into production for extraction of oil and/or gaseous hydrocarbon. After the treatment, the permeability to oil and/or gaseous treatment in the treated area is negligibly affected, while the permeability to water is strongly reduced.

It should be borne in mind that although the present application is mainly focused on the reduction of the water permeability in high permeability oil-bearing subterranean formations, it is also applicable to formations of variable permeability. Adapting the process to such different conditions is secured by adapting the polymer systems and the microgel particle size distribution to the reservoir fluids, to the formation temperature and to the rock permoporous conditions.

The selective systems design depends on the rock mineralogy and its permeability, on the temperature and on the formation water salinity. As regards the rock permeability, the higher the permeability, the higher should be the polymer hydrodynamic volume, in cases where the hydrophilic film is made up of one single polymer layer, as described in the said U.S. Pat. No. 6,474,413 (hereinafter designed as SELEPOL 1).

It is also possible to increase the film thickness by alternately adding successive polymer layers and other chemical agents (SELEPOL 2 and 3) forming thereby the multilayer configuration. The choice of the cationic and anionic polymers depends on the temperature and salinity of the reservoir water.

Researches conducted by the Applicant that led to the present application aimed at the development of a selective process for high permeability reservoirs having high production rates. This renders the present process suitable for most of the large reservoirs owed by the Applicant, such as the Marlim field.

It is also known that traditionally, selective and successful processes for high permeability formations make use of blockers. However, a drawback of this technique frequently requires the isolation of the water intervals from those of oil, which represents extremely high costs when treating satellite wells of offshore wells. To this should be added the low effectiveness of these isolations in high vertical conductivity reservoirs, largely increasing the uncertainty of placing the blocking barriers only in the water channels. Under these circumstances, cost and high damage risk of the flow of oil are summed up.

The use of polyacrylamide crosslinked microgels of controlled particle size distribution is very promising for the several applications directed to the improvement in the water production control. The use of suitable reaction conditions and a proper polymer/crosslinking agent can lead to polymer structures of desired properties, such as elasticity degree and particle size distribution.

For the application described in the present application, the injection of microgels of controlled particle size distribution avoids the risks inherent to the in situ gelling process, the delicate control of such technique being well known.

Figure 1:
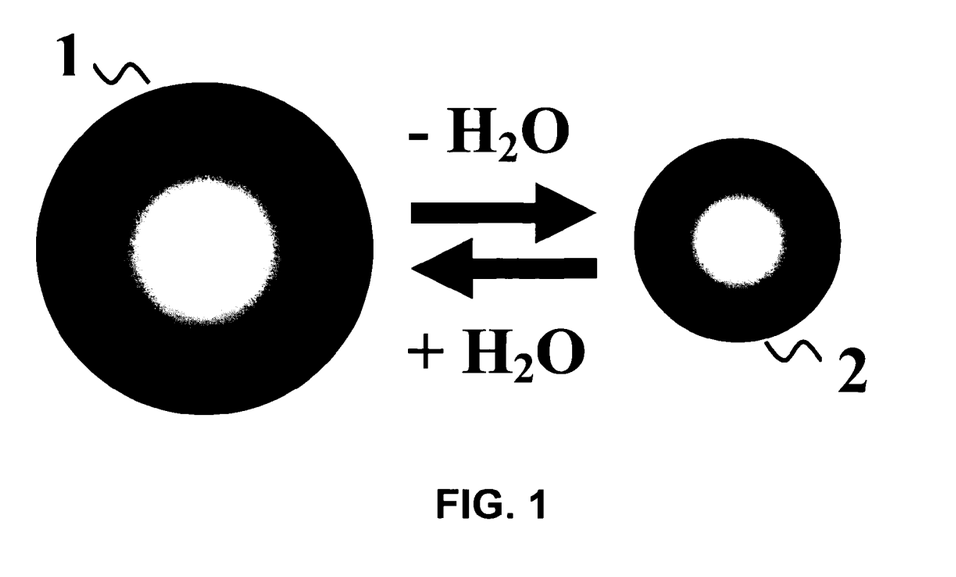
FIG. 1 attached is a schematic representation to respectively illustrate the reversible swelling and shrinking of microgel particles in a water environment and in an oil environment.

FIG. 1 illustrates the behavior of a typical microgel useful for the present process, water-swollen and of reduced size in the dehydrated state, the characteristic reversibility of these systems being highly positive for the purposes of the invention.

Figure 2:
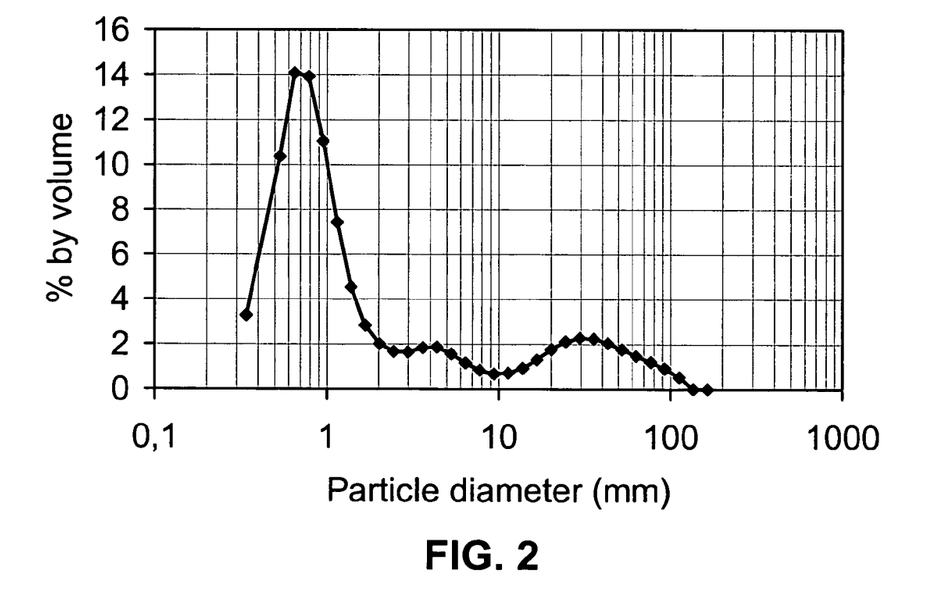
FIG. 2 attached is a plot illustrating particle size distribution of a microgel, expressed in volumetric distribution.

According to the concept of the invention, the microgel selection is based on the distribution factors of the reservoir pore throat and microgel particle size distribution. This latter quantity should be narrow, in a selected range that is best suited to the reservoir pore throat. FIG. 2 illustrates such a distribution.

Advantageously, the inventive process that uses for a sandstone reservoir rock a first layer of cationic polymer, followed by a spacer brine slug and a second polymer layer made up of a suspension of an anionic polymer and a microgel, optionally this configuration being repeated, considerably increases the adsorption on the rock, forming thick layers, so as to make the process suitable for high permeability rocks.

The spacer brine slug between the solution/suspension polymer slugs permits the displacement and separation between the polymer slugs, as well as the adsorption of the several polymer slugs to the previously formed polymer films, without the occurrence of blocking precipitates, and to the desired treatment extent.

Contrary to the process object of U.S. Pat. No. 6,474,413, in the present invention there is no need to use a crosslinking agent to impart higher strength to the polymer film.

According to the invention, in order to reduce the viscosity of the polymer solution/suspension and avoid swelling of formation clays, the dissolution/suspension of slug-forming polymer is performed in brine.

For low permeability (from 100 to 300 mD), low salinity producing subterranean formations the present process involves the injection, in the producing well, of one single layer of high molecular weight cationic polymer, or a layer of low molecular weight cationic polymer followed by a layer of a suspension of anionic polymer/low molecular weight anionic or non-ionic microgel, followed or not by other layers of cationic polymer and anionic polymer/anionic or non-ionic microgel suspension.

For limestone-rich subterranean formations, the process of the invention comprises the injection of an anionic polymer aqueous solution, followed by an aqueous brine spacer slug and a layer of an aqueous cationic polymer/cationic or non-ionic microgel suspension, according to the same criteria of kind of polymer and number of layers required for sandstone-rich rocks.

The chemical and thermal stability degree of the anionic and cationic polymers useful for the present process should be such that these products can withstand reservoir temperatures up to 110° C.

The amount of polymer used in the composition to be injected varies within wide ranges. For cationic polymers, the amounts are usually in the range between 500 and 5,000, preferably between 1,000 and 3,500, and still more preferably, between 2,500 and 3,000 ppm weight of polymer based on the aqueous solution.

While for the suspension of anionic polymers/anionic or non-ionic microgels, the quantities used vary between 500 and 5,000, preferably between 1,000 and 2,500, still more preferably between 1,500 and 2,000 ppm weight of polymer based on the overall suspension.

The microgel forming the suspension with an anionic or cationic polymer is used in amounts ranging between 100 and 5,000 ppm, according to the permoporous reservoir conditions.

The polymer amount by weight in the aqueous polymer solutions/suspensions slugs as well as the volumes to be injected are determined based on rock adsorption tests and will vary as a function of the radial distance to be attained by the polymer aqueous solution/suspension slug in the reservoir interior.

Analogously to the process object of U.S. Pat. No. 6,474,413, in the present process the spacer slugs and the successive polymer solutions/suspensions displace the more concentrated solutions towards the desired penetration, in an injection pattern that forms varied thickness layers, the first layer having higher reservoir penetration, the second, slightly lower penetration, and so on. The last layer, closer to the well face, is the thicker. The general shape of the layers in the formation interior is that of a wedge, this shape protecting the well face.

The molecular weight of the polymers useful for the present invention can vary within wide limits, and in general comprises molecular weights between 1.000 and $30.10^6$ dalton. The molecular weight of the polymers of lower molecular weight is between 1,000 and $3.10^6$ dalton, preferably between 200,000 and $1.10^6$ dalton. The polymers of higher molecular weight have molecular weights in the range of $3.10^6$ up to $30.10^6$ dalton.

In the present process the polymers are solubilized/suspended in water of any salinity, including seawater. The polymers tested in the present process admit salinities up to 200,000 ppm equivalent in NaCl.

In the polymer/microgel suspension the polymer and the micfogel are both cationic or both anionic. Non-ionic microgels can be utilized with cationic or anionic polymers.

The injection of each polymer slug is preceded by the injection of a brine slug such as KCl as clay conditioner and for determining the suitable pressure and flow rate for polymer injection.

After the injection of each polymer slug a new brine slug is injected in order to displace the polymer slug towards the interior of the formation.

The present specification report data obtained from bench-scale experiments for determining the physical chemical properties of the microgels, as well as the behavior thereof in a porous medium, this forming the basis for using such compounds in operations for the water permeability control in high permeability, oil-bearing subterranean formations.

The aqueous solutions/suspensions comprise polymers having the structures described hereinbelow.

Preferred marketed cationic polymers are derived from dimethyl ethyl aminoacrylate (ADAM) (structure I) and dimethyl amino ethyl methacrylate (MADAM) (structure II):

Quaternization of (I) with dimethyl sulfate yields structure (III) or ADQUAT:

Quaternization of (II) with the same dimethyl sulfate yields structure (IV) or MADQUAT:

And the quaternization of the same structure (I) through chloromethylation leads to structure ADCL (V)

The quaternization of structure (II) through chloromethylation yields structure MADCL (VI)

A copolymer of acrylamide AM and ADQUAT yields structure (VII)

(VII)

A copolymer of acrylamide AM and ADCL yields structure (VIII)

(VIII)

A copolymer of acrylamide AM and MADQUAT yields structure (IX)

(IX)

A copolymer of acrylamide AM and MADCL yields structure (X)

(X)

Other useful products are reaction products from dimethyl amine (DMA) and epichlorhydrine, as can be seen below, structure (XI), representing a polyamine:

(XI)

A further useful product is the reaction product of methyl amine and epichlorhydrine, to yield structure (XII) below:

(XII)

The basic structure for forming anionic polymers for use in the invention is partially hydrolyzed acrylamide.

A further structure useful as a basis for anionic copolymers or terpolymers to be utilized is structure (XIV) below, 2-acrylamido-2-methyl propanesulfonic acid (AMPS) monomer:

(XIV)

A terpolymer derived from AMPS, acrylamide and acrylic acid and also useful for conditions of high temperature and salinity is structure (XV) below;

(XV)

A further related product is structure (XVI) below:

(XVI)

Where m+n=100 and m is between 1 and 99 while n is between 1 and 100.

Cationic and anionic polymers useful for the process are those that can be solubilized in brines such as seawater. The preparation of polymer solutions in brines aims at permitting possible treatments of huge volumes, so as to by-pass drawbacks related to industrial water supply in platforms.

Especially suitable are polymers bearing low ionic charge (lower hydrolysis degree) and/or higher hydrodynamic volume associated to crosslinked acrylamide-based polymer microgels of controlled particle size distribution.

Useful microgels are marketed products based on polyacrylamide of hydrolysis degree between 0 (non-ionic) and 20% (anionic or cationic), and particle size distribution between 0.1 and 200 microns, preferably between 1 and 10 microns, and still more preferably between 2 and 4 microns.

In the present process the multi-layer configuration of the SELEPOL 2 process is kept as such, this configuration consisting, for sandstone rocks, in the injection of two polymer layers: the first, a cationic polymer and the second, a suspension of anionic polymers/microgel. For limestone rocks, the first layer involves an anionic polymer. If required, repeat the injections in order to form a layered configuration.

The anionic polymer useful for each application should be previously tested as for the chemical stability in the water used for preparing the solution and in the production water so as to obtain the desired effect.

Especially useful polymers and microgels, without being limited to those, for injection according to the concept of the invention are listed below.

FL-18 product is a cationic copolymer obtained by copolymerizing epichlorhydrine and dimethyl amino ethanol acrylate (ADAME), the physical chemical properties of which are listed in Table 1 below.

TABLE 1

| FL-18 product | Epichlorhydrine + dimethylamine |
|---|---|
| Aspect | Reddish solution |
| Specific gravity (25° C.) | 1.01 to 1.05 g/cm$^3$ |
| pH (25° C.) | 4 |
| Active Matter | 50% |
| Ionic Charge | Cationic (90%) |
| Brookfield Viscosity (25° C.) | 3,000 cp |
| Molecular Weight | 1,000 Dalton |

The DW430 product is an anionic copolymer obtained by copolymerizing acrylamide and acrylic acid, the physical chemical properties of which are listed in Table 2.

TABLE 2

| DW430 product | polyacrylamide + acrylic acid |
|---|---|
| Aspect | Slightly whitish emulsion |
| Specific gravity (25° C.) | 1.01 to 1.05 g/cm$^3$ |
| pH (25° C.) | 6 to 7 |
| Active Matter | 30% |
| Ionic Charge | Anionic (10%) |
| Brookfield Viscosity (25° C.) | 3,000 cp |
| Molecular Weight | 30 × 10$^6$ Dalton |

The DP/BQ—2252 product is an anionic microgel of known particle size distribution, obtained by polymerizing acrylamide, AMPS and acrylic acid with a crosslinking agent. The physical chemical properties of such product are listed in Table 3.

TABLE 3

| DP/BQ 2252 product | acrylamide + AMPS + acrylic acid + crosslinking agent |
|---|---|
| Aspect | Suspension |
| Specific gravity (25° C.) | 1.01 to 1.05 g/cm$^3$ |
| pH (25° C.) | 6 |
| Active Matter | 30% |
| Ionic Charge | anionic (5%) |
| Average particle size | 2 μm |
| Brookfield Viscosity (25° C.) | 3,000 cp |
| Molecular Weight | Indefinite |

The FO4990 SH product is a cationic copolymer obtained by polymerizing acrylamide and ADQUAT, the physical chemical properties of which are listed in Table 4.

TABLE 4

| FO4990 SH product | Acrylamide + ADQUAT |
|---|---|
| Aspect | Powder |
| Specific gravity (25° C.) | 1.01 to 1.05 g/cm$^3$ |
| pH (25° C.) | 4 |
| Active Matter | 50% |
| Ionic Charge (Al$^{+3}$) | cationic(100%) |
| Brookfield Viscosity (25° C.) | 3,000 cp |
| Molecular Weight | 18 × 10$^6$ Dalton |

The DP/BQ-2305 Product is a cationic microgel of known particle size distribution, obtained by copolymerizing acrylamide, ADCL and a crosslinking agent the physical chemical properties of which are listed in Table 5.

TABLE 5

| DP/BQ 2305 Product | acrylamide + ADCL + crosslinking agent |
|---|---|
| Aspect | Suspension |
| Specific gravity (25° C.) | 1.01 to 1.05 g/cm$^3$ |
| pH (25° C.) | 6 |
| Active Matter | 30% |
| Ionic Charge | cationic(5%) |
| Average Particle size | 2 μm |
| Brookfield Viscosity (25° C.) | 3,000 cp |
| Molecular Weight | indefinite |

Preparation of Polymeric Solutions

Brine

Seawater was used in the displacement tests with rock from an onshore field for plug saturation, fluid displacement and preparation of the polymeric solutions. Table 6 below shows the ionic composition of that water, assessed with the aid of Atomic Emission Spectrometry technique.

TABLE 6

| ION | Accepted | COMPOSITION (mg/l) |
|---|---|---|
| Acetate | — | 78 |
| Barium | — | 0.02 |
| Bicarbonate | — | 112 |
| Bromide | — | 85 |
| Calcium | <1 | 450 |
| Chloride | — | 19,400 |
| Carbonate | — | 14 |
| Strontium | — | 8 |
| Soluble Iron | <1 | 0.27 |
| Total Iron | <1 | 0.35 |
| Fluoride | — | <10 |
| Formiate | — | — |
| Phosphate | — | <10 |
| Iodide | — | <10 |
| Lithium | — | <0.08 |
| Magnesium | <1 | 1,300 |
| Nitrate | — | 13 |
| OH— | — | — |
| Potassium | — | 360 |
| pH | — | 8.5 |
| Sulfate | — | 2,800 |

In displacement tests using offshore field plugs the saturation thereof was carried out with synthetic water similar to the formation water of this field.

Table 7 below shows the composition of the synthetic water similar to the offshore field water.

TABLE 7

| | Concentration (mg/l) |
|---|---|
| Cations | |
| Fe | 0 |
| Mg | 325 |
| K | 102 |
| Ba | 46 |
| Sr | 198 |
| Ca | 818 |
| Na | 20,000 |
| Anions | |
| Cl | 33,700 |
| SO$_4$ | 0 |
| CO$_3$ | 0 |
| HCO$_3$ | 390 |
| Br | 75 |
| B$_4$O$_7$ | 0 |

For the preparation of the synthetic water, salts are dissolved in distilled water and the solution is filtered in a 0.45 μm filter.

Oil

The oil utilized in the various displacement tests is a 1/1 (vol/vol) mixture of ENCA/NUJOL mineral oils, providing a viscosity value of 7 cp at 70° C. This viscosity value was chosen based on the fact that this is that field oil viscosity under reservoir conditions.

Polymer Solutions

The methodology used for preparing solutions of cationic FL-18 polymer, without being limited to such specific polymer, is as follows:

The chosen amount of polymer is quickly added to 400 ml seawater under high agitation (700 rpm). Then the speed is lowered up to 500 rpm for 15 minutes. Then the solution is diluted up to the concentration of 3,000 ppm. Seawater is used for preparing the solutions. The seawater composition is shown in Table 6.

The preparation of anionic DW 430 polymer solution and of the microgel suspension DP/BQ 2252, without being limited to those, is carried out according to the following procedure.

The solutions are prepared by quickly adding the chosen amount of DW 430 polymer to 400 ml seawater under high agitation. After 5 seconds under high speed, the solutions are kept for 2 hours at a speed of 500 rpm. After that period a determined amount of the suspension of DP/BQ 2252 polymer microgels is added to the previously prepared solution and kept under agitation of 500 rpm for one additional hour. Then the solution is diluted to the desired concentration. Seawater, the composition of which is shown in Table 6, is used for preparing the solutions/suspensions.

The preparation of cationic polymer FO 4650 SH solution with the DP/BQ 2305 microgel suspension follows the same methodology described hereinbefore.

Figure 3:
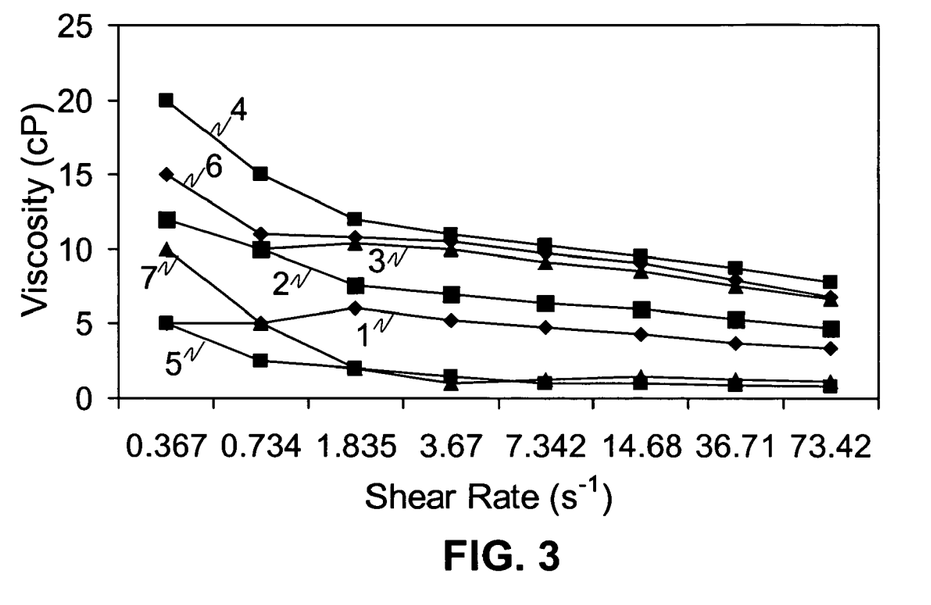
FIG. 3 attached illustrates viscosity vs. shear rate curves for the polymer solutions used in the displacement tests.

FIG. 3 shows the viscosity vs. shear curves for the aqueous polymer solutions and Table 8 below summarizes the concentrations and viscosities of such solutions for a certain shear condition typical of porous media, all viscosities being measured at 70° C. In FIG. 3, curves are numbered according to Table 8.

TABLE 8

| Curve N° in FIG. 3 | Polymer Solution | Viscosity (cP) @ 70° C. temperature and shear rate 6 s$^{-1}$ |
|---|---|---|
| 1 | DW 430 1,000 ppm | 4.75 |
| 2 | DW 430 1,000 ppm + DP/BQ 2252 1,000 ppm | 6.40 |
| 3 | DW 430 1,000 ppm + DP/BQ 2252 2,000 ppm | 9.10 |
| 4 | DW 430 1,000 ppm + DP/BQ 2252 3,000 ppm (solução filtrada) | 10.25 |
| 5 | FO 4650 SSH 1,600 ppm + DP/BQ 2305 400 ppm | 1.00 |
| 6 | DW 430 1,600 ppm + DP/BQ 2252 400 ppm | 9.75 |
| 7 | FL 18-3,000 PPM | 1.25 |

Laboratory Tests

Laboratory tests involve two aspects.

A first aspect is the survey of the several physical chemical parameters of the polymer systems used in the invention.

A second aspect comprises the evaluation of the various systems in a porous medium.

According to the first aspect, the physical chemical parameters comprise:

Rheology

Microgel particle size distribution

And according to the second aspect, the evaluation of the several systems in a porous medium is carried out through single phase and dual phase displacement tests.

These aspects are detailed below.

Rheology

This study is intended to predict the behavior of viscosified fluids under flow conditions. To that end, a Model LVT Brookfield viscometer was used.

The polymer systems made up of anionic polymer plus microgels herein tested belong to the class of non-newtonian fluids, more specifically, to the group of the pseudoplastic fluids, where the viscosity diminishes for higher shear rates. The most widely used mathematical model for the description of this model is the Ostwald model or power model.

Particle Size Distribution

The Particle Size Distribution is determined with the aid of a Master Sizer X instrument. The principle of operation of this instrument is light diffraction, where the intensity of scattered light is measured as a function of the scattering angle, so as to generate a diffraction pattern from which information can be obtained on the particle size making use of certain optical theories (Mie and Fraunhofer theory). The source of light used for the measurements is a 25 mW He—Ne LASER.

Procedure and Comments on the Tests

In order to carry out a test on a polymer solution having seawater as solvent the sample is re-dispersed in brine by agitation.

Several tests are performed by taking different aliquots of the original sample.

Obtained results and corresponding plot are expressed in terms of volumetric distribution in FIG. 2.

The sample presents a main peak for the 0.7 micron size, showing a smaller population in the range above 0.7 to 100 microns.

Values of D(0.1), D(0.5) and D(0.9) are listed in Table 9 below with values for particle size distribution for some polymer microgel suspensions. In the Table, D(0.1) means that 10% of the particles are below the listed value, D(0.5), 50%, and D(0.9), 90% of the particles below the listed value. In Table 9 the NF notation means that the tested solution was not filtered, while the notation F means that the solution underwent filtration on a 7 micron filter. In test 2, the filtration withdraws particles above the 7 micron size.

TABLE 9

| N° | SAMPLE | D(0.1) μM | D(0.5) μm | D(0.9) μm | NOTE. |
|---|---|---|---|---|---|
| 1 | DW 430 Pal. sol.- 1,000 ppm + DP/CJNF 2298-1,000 ppm In brine | 1.5 | 2.79 | 35.3 | NF |
| 2 | DW 430 Pal. sol- 1,000 ppm + DPCJNF 2298-1,000 ppm In brine | 1.4 | 2.1 | 4.17 | F |
| 3 | DW 430 Pal. sol- 1,000 ppm + DP/BQNF 2252-1,000 ppm In brine | 0.55 | 0.99 | 30.82 | NF |

TABLE 9-continued

| N° | SAMPLE | D(0.1) μM | D(0.5) μm | D(0.9) μm | NOTE. |
|---|---|---|---|---|---|
| 4 | DP/BQNF 2367-1,000 ppm In brine | 5.87 | 93.64 | 284.5 | NF |
| 5 | DP/BQNF 2368-1,000 ppm In brine | 4.55 | 25.28 | 68.47 | NF |

DP/BQNF 2367, 2368, 2252 e DPCJNF 2298 products shown in the above Table are analogous to the microgels of Tables 3 and 5.

An important test for the selection of the controlled particle size microgel is the data obtained from the Pore Throat Distribution test of the reservoir rock.

Preliminary tests were carried out according to a monolayer configuration similar to the SELEPOL 1 technique of U.S. Pat. No. 6,474,413. These tests aimed at a first assessment of the association selectivity of high molecular weight polymers and microgels, combined according to their ionicity as shown in Table 10 below. Also, the tests aimed at determining the influence of the polymer concentration.

TABLE 10

| Combination | Kinds of products |
|---|---|
| DW430 + DP2252 | DW430 anionic polymer |
|  | DP2252 anionic microgel |
| FO4650 + DP2305 | FO4650 cationic polymer |
|  | DP2305 cationic microgel |

Table 11 shows features of the plugs employed in the tests, and Table 12 the data obtained, where the Residual Resistance Factors for water and oil (RRFw and RRFo) represent the relationship between effective permeability to water and to oil, before and after the treatment, that is, represent the damage to the flow introduced by the treatment. RRFN is the ratio between RRFw and RRFo. The best conditions are expressed by high values of RRFw and RRFN, while RRFo is close to 1.

TABLE 11

| Feature | Test 1 | Test 2 | Test 3 | Test 4 | Test 5 | Test 6 | Test 7 |
|---|---|---|---|---|---|---|---|
| Rock | Sands. | Sands. | Sands. | Sands. | Sand* | Sands. | Sands. |
| Diameter (cm) | 3.75 | 3.75 | 3.75 | 3.79 | 4.02 | 3.76 | 3.76 |
| Length (cm) | 6.38 | 7.25 | 7.26 | 7.28 | 31.6 | 7.32 | 7.32 |
| Weight (g) | 138.5 | 159.3 | 160.8 | 159.6 | — | 158.9 | 163.5 |
| Density (g/cm³) | 2.64 | 2.64 | 2.64 | 2.64 | 2.64 | 2.64 | 2.64 |
| Porosity | 24.0 | 22.6 | 22.1 | 22.5 | 29.3 | 22.81 | 22.22 |
| Pore volume (cm³) | 16.9 | 18.0 | 17.8 | 18.5 | 117.6 | 18.54 | 18.06 |

Test 5: Selected sand 70% (20/30) and 30% Berea sand (80/100)

TABLE 12

| Test | Treatment | Pore Volume (PV) | Kair | RRFw | RRFo | RRFN |
|---|---|---|---|---|---|---|
| 1 | DW430 800 ppm + DP2252 200 ppm | 1 | 1389 | 5.8 | 1 | 6 |
| 2 | DW430 800 ppm + DP2252 200 ppm | 1 | 1099 | 5.6 | 1.6 | 3.6 |
| 3 | DW430 1600 ppm + DP2252 400 ppm | 1 | 956 | 9.3 | 1.2 | 7.7 |
| 4 | FO4650 1600 ppm + DP2305 400 ppm | 1 | 1062 | 4 | 1.5 | 2.6 |
| 5 | DW430 1,600 ppm + DP2252 400 ppm | 1 | 2,250 | 4.3 | 1.7 | 2.5 |
| 6 | DW430 1,000 ppm | 1 | 943 | 2.2 | 1.7 | 1.3 |
| 7 | DW430 1,000 ppm | 1 | 931 | 4.4 | 1.4 | 3.2 |

From the data of Table 12 it can be observed that:

Tests 1 to 4 are comparable among themselves, all for permeability in the range of 1 Darcy. A fairly selective behavior can be noticed.

By comparing tests 1 and 2 with test 3, the effectiveness of the treatment can be noticed when the polymer concentration is doubled, while the damage to oil is kept small.

When compared to test 3, test 4 shows a slightly higher effectiveness of the Anionic polymer+Anionic Microgel system.

Contrary to the other tests, test 5 was carried out using compacted sand. Even at this higher permeability, the treatment kept its effectiveness and selectivity.

For the sake of comparison, tests 6 and 7 have employed the high molecular weight polymer only, without microgel, according to the technique object of U.S. Pat. No. 6,474,413. It can be seen that the process of the invention using a microgel is more effective.

The high RRFw values especially in test 3 and low RRFo values lead to the conclusion that the basic concept adopted –"polymer+microgel" is effective and selective even at high permeability values. Still, it is concluded that the "anionic polymer DW430+anionic microgel DP2252" couple has shown the best results, and that the polymer concentration is a parameter of paramount importance for the system dimensioning.

Filtrability/injectivity tests were also performed so as to check the injection behavior of the "DW430+DP 2252" system, and the possibility of pore plugging, injectivity loss and possible reduction of the rock absolute permeability. The effective permeability to water is the parameter to be reduced, however, this should be accomplished without any important damage to absolute permeability.

Table 13 lists the features of the plugs employed in the tests and Table 14, RRFw. The tests used huge treatment volumes so as to extrapolate any injectivity losses.

TABLE 13

| Feature | Test 8 | Test 9 | Test 10 | Test 11 |
|---|---|---|---|---|
| Rock | Sandstone | Sandstone | Sandstone | Sandstone |
| Diameter (cm) | 3.75 | 3.75 | 3.75 | 3.75 |
| Length (cm) | 7.27 | 7.25 | 7.25 | 7.22 |
| Weight (g) | 158.0 | 162.6 | 157.7 | 155.0 |
| Specific gravity (g/cm$^3$) | 2.64 | 2.64 | 2.64 | 2.64 |
| Porosity | 25.5 | 23.2 | 25.1 | 25.1 |
| Pore volume (cm$^3$) | 20.5 | 18.6 | 20.1 | 20.0 |

TABLE 14

| Test | Treatment | Volume (PV) | Kair | FRRw |
|---|---|---|---|---|
| 8 | DW430 1,000 ppm + DP2252 1,000 ppm | 10 | 1,351 | 6.1 |
| 9 | DW430 1,000 ppm + DP2252 1,000 ppm | 11 | 1,052 | 5.9 |
| 10 | DW430 1,000 ppm + DP2252 1,000 ppm | 10 | 1,145 | 8.9 |
| 11 | DW430 1,000 ppm + DP2252 1,000 ppm | 10 | 963 | 14.6 | where Kair is the absolute permeability to air.

Figure 4:
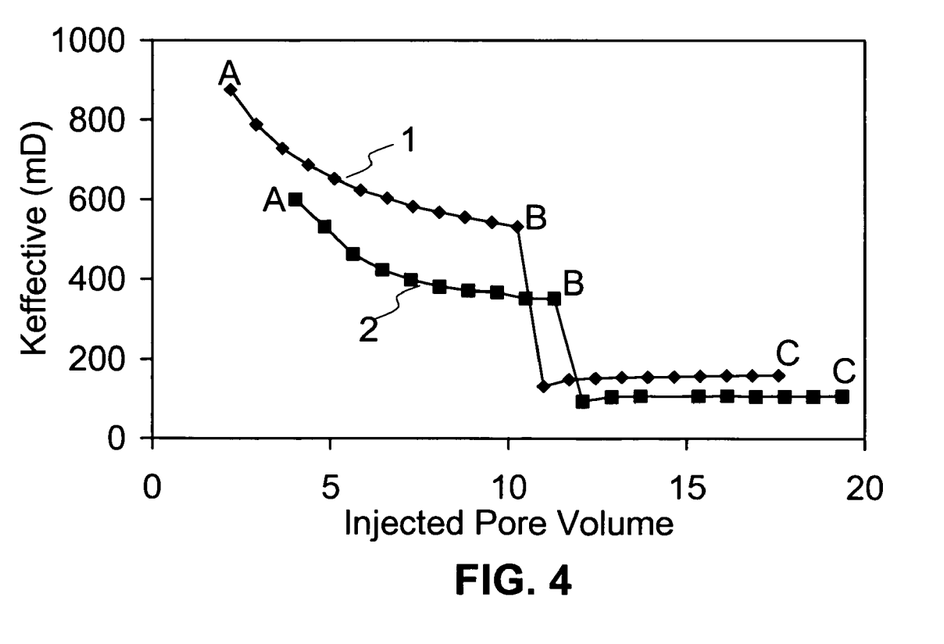
FIG. 4 attached illustrates a permeability vs injected porous volume (IPV) plot for filtrability tests 9 and 10.

FIG. 4 shows the behavior of the effective permeability (Keffective) to the polymeric solution and to the post-treatment water vs. injected pore volumes (IPV). In FIG. 4, curve 1 refers to test 9 while curve 2 refers to test 10. The A-B portion represents the injection of treating aqueous solutions and portion B-C, the injection of water. Please note that data used for drawing FIG. 4 are not part of the following Tables.

Data from FIG. 4 shows that:

There is a trend for stabilizing the effective permeability throughout the treatment injection, which evidences that there is no pore plugging by microgel particles. On the contrary, would this happen, the trend to a fall would be constant or even rising;

Additionally, the post-treatment effective stabilization of the water permeability is also observed, as evidence of the strong adsorption of the treatment to the rock. Desorption, or treatment entrainment, would lead to a recovery in permeability.

Then, tests were carried out on Marlim rocks (the features of the tested plugs are shown in Table 15), such as shown in Table 16.

Such tests involve multilayered-configured treatments, including a first anchoring slug of cationic polymer, in a similar way to that of U.S. Pat. No. 6,474,413. Since sandstone has a more anionic character, the cationic polymer is strongly adsorbed to it, and on said first layer, adsorbs the anionic polymer+anionic or non-ionic microgel.

TABLE 15

| Feature | Test 12 | Test 13 | Test 14 | Test 15 and 15B | Test 16 | Test 17 |
|---|---|---|---|---|---|---|
| Rock | Sands. | Sands. | Sands. | Sands. | Sands. | Sands. |
| Diameter (cm) | 3.81 | 3.81 | 3.81 | 3.81 | 3.81 | 3.81 |
| Length (cm) | 5.47 | 5.56 | 4.80 | 4.44 | 5.40 | 5.20 |
| Weight (g) | 130.7 | 130.66 | 121.4 | 105.44 | 127.7 | 129.1 |
| Specific gravity (g/cm$^3$) | 2.64 | 2.64 | 2.63 | 2.65 | 2.64 | 2.65 |
| Porosity | 30.76 | 30.81 | 29.0 | 28.8 | 28.6 | 29.1 |
| Pore volume (cm$^3$) | 19.2 | 19.5 | 15.88 | 14.60 | 17.3 | 17.7 |
| Temperature (°C.) | 24 | 24 | 70 | 70 | 70 | 70 |

TABLE 16

| Test | Treatment | Kair | RRFw | RRFo | RRFN |
|---|---|---|---|---|---|
| 12 | 2PV FL18 3,000 ppm + 3PV (DW430 1,000 ppm + DP2252 3,000 ppm) | 3,353 | 16.4 | 2 | 8.2 |
| 13 | 1PV FL18 3,000 ppm + 2PV (DW430 1,000 ppm + DP2252 3,000 ppm) | 2,930 | 16.3 | 0.9 | 17.9 |
| 14 | 1PV FL18 3,000 ppm + 2PV (DW430 1,000 ppm + DP2252 3,000 ppm) | 3,057 | 33.6 | 3 | 11.3 |
| 15 | 1PV FL18 3,000 ppm + 1PV (DW430 1,000 ppm + DP2252 3,000 ppm) | 3,666 | 10.8 | 1.1 | 9.7 |
| 15B | 1PV (DW430 1,000 ppm + DP2252 3,000 ppm) | 3,666 | 18 | 1.5 | 11.8 |
| 16 | 1PV FL18 3,000 ppm + 1PV (DW430 1,000 ppm + DP2252 3,000 ppm) | 3,016 | 15.4 | 2 | 7.8 |
| 17 | 1PV FL18 3,000 ppm + 1PV (DW430 1,000 ppm + DP2252 1,000 ppm) | 2,291 | 3 | 1.1 | 2.6 |

From the tests and data of Table 16:

Higher microgel concentrations were employed in tests 12 to 16, and by comparison with test 17, it could be stated that the microgel content is determinant in the effectiveness treatment.

It is important to point out that data interpretation should not be too rigorous, and that on the contrary the trend of resistance factors should be observed since, on a test-by-test basis, permeability values, geometry and pore dimensions, clay content, specific surface and other parameters can vary.

As an example of the previous comment, by comparing tests 12 and 13, the first had larger treatment volumes, at an equivalent RRFw, and higher RRFo. On the other hand, the test 12 permeability was higher. Such data can be considered as equivalent, with high RRFw for permeability values of this magnitude, and RRFo smaller in test 13, which is an evidence of lower damage to oil, fair effectiveness and selectivity. And the difference in permeability is compensated by the larger volumes of test 12.

The comparison of tests 12 and 13 with test 14 shows RRFN of the same magnitude but higher RRFo and RRFw, showing a different trend. One more test was then performed—test 15.

In test 15 smaller volumes were employed and the concentrations were kept as such. The trend of tests 12 and 13 was repeated, only at a little more modest values. In the same sample, one additional Pore Volume was injected (test 15B), so as to strengthen the treatment to the same level of previous ones.

Tests 12 and 13 were carried out at ambient temperature and the other ones at the Marlim temperature. In spite of the fact that the temperature is a very important parameter as regards polymer strength, and as such it should always be considered when designing treatments, obtained data show that the products are quite resistant to the Marlim temperature.

Table 17 lists the effect of the microgel concentration on the treatments performed according to the present process (tests 16 and 17), as compared to a test without any microgel (state-of-the-art technique, as represented by U.S. Pat. No. 6,474,413).

TABLE 17

| Test | Treatment | Kair | RRFw | RRFo | RRFN |
|---|---|---|---|---|---|
| 16 | 1PV FL18 3,000 ppm + 1PV (DW430 1,000 ppm + DP/BQ2252 3,000 ppm) | 3,016 | 15.4 | 2 | 7.8 |
| 17 | 1PV FL18 3,000 ppm + 1PV (DW430 1,000 ppm + DP/BQ2252 1,000 ppm) | 2,291 | 3 | 1.1 | 2.6 |
| State-of-the-art | Selepol 3 with 0.3PV EM949 3,000 ppm + 0.5PV EM1030 2,000 ppm + 0.5PV PE8057 500 ppm | 2,900 | 5.7 | 3.2 | 1.8 |

We claim:

1. A process for the selective and controlled reduction of permeability to water of high permeability oil-bearing subterranean formations and temperature up to 110° C. traversed by a well for the production of oil and/or gas, wherein said process comprises, for said well the following steps:
   a) injecting a slug of a cationic polymer aqueous solution in the amount required for adsorption at a certain penetration radius in said subterranean formation, a portion of said aqueous solution creating a polymer adsorbed to the formation and containing free positive residual charges, while another portion remains non-adsorbed and can be displaced by successive brine and polymer/microgel slugs up to the required penetration radius;
   b) injecting a spacer slug of an aqueous brine solution, so as to displace said non-adsorbed portion of the slug of aqueous cationic polymer solution towards the interior of the formation, whereby will be separated the slug of cationic polymer solution already injected and the slug of anionic polymer/anionic or non-ionic microgel suspension to be injected;
   c) injecting a slug of anionic polymer and anionic or non-ionic microgel aqueous suspension in a sufficient amount to form a layer of anionic polymer and said microgel adsorbed to the cationic polymer layer already adsorbed to the subterranean formation rock;
   d) injecting a spacer slug of an aqueous brine solution for spacing the polymer slugs and displacing the slug of anionic polymer/anionic or non-ionic microgel aqueous suspension towards the interior of the formation;
   e) if required, repeating the treatment sequence a), b) and c) until the injection pressure of the aqueous solution of step d) attains a value such as to reach the desired value of Residual Resistance Factor to water (RFFw);
   f) shut-in the well during the required period of time to finish the adsorption process among the layers; and
   g) resuming well production.

2. A process according to claim 1, wherein the subterranean oil-bearing formation is a sandstone formation.

3. A process according to claim 1, wherein the water used for preparing the aqueous polymer solutions has any salinity, including seawater.

4. A process according to claim 3, wherein the salinity of the water used for preparing the aqueous polymer solutions attains 200,000 ppm NaCl equivalent.

5. A process according to claim 1, wherein the cationic polymer comprises copolymers of acrylic acid and acrylamide and its esters, quaternized or not with dimethyl sulfate or chloromethylation, copolymers of methacrylic acid and acrylamide and its esters, quaternized or not with dimethyl sulfate or chloromethylation, polyacrylamide, partially hydrolyzed polyacrylamides and polyamines.

6. A process according to claim 5, wherein the cationic copolymer is obtained by polymerizing epichlorhydrine with dimethyl amino ethanol acrylate (ADAME).

7. A process according to claim 1, wherein the anionic polymer comprises acrylamide copolymerized with acrylic acid, AMPS and its copolymers and terpolymers in any amount.

8. A process according to claim 1, wherein the microgel comprises polyacrylamide copolymers crosslinked with a crosslinking agent with hydrolysis degree between 0 (non-ionic) and 20% (anionic or cationic).

9. A process according to claim 8, wherein the particle size distribution of the microgel is between 0.1 and 200 microns, preferably between 1 and 10 microns, and still more preferably between 2 and 4 microns.

10. A process according to claim 1, wherein the permeability of the reservoir rock is medium or low.

11. A process according to claim 1, wherein the polymer aqueous solutions/suspensions contain between 500 and 5,000 ppm, preferably between 1,000 and 3,500 ppm, and still more preferably, between 2,500 and 3,000 ppm of cationic polymer.

12. A process according to claim 1, wherein the polymer aqueous solutions/suspensions contain between 500 and 5,000 ppm, preferably between 1,000 and 2,500 ppm, and still more preferably, between 1,500 and 2,000 ppm of anionic polymer.

13. A process according to claim 1, wherein the aqueous suspension of anionic (cationic) polymer/microgel contains between 100 to 5,000 ppm microgel.

14. A process according to claim 1, wherein in the aqueous polymer/microgel suspension the polymer and the microgel are both cationic or both anionic.

15. A process according to claim 14, wherein alternatively the microgel is non-ionic.

16. A process for the selective and controlled reduction of permeability to water of high permeability oil-bearing subterranean formations and temperature up to 110° C. traversed by a well for the production of oil and/or gas, wherein said process comprises, for said well the following steps:
   a) injecting a slug of an anionic polymer aqueous solution in the amount required for adsorption at a certain penetration radius in said subterranean formation, a portion of said aqueous solution creating a polymer adsorbed to the formation and containing free negative charges, while another portion remains non-adsorbed and can be displaced by successive brine and polymer/microgel slugs up to the required penetration radius;
   b) injecting a spacer slug of an aqueous brine solution, so as to displace said non-adsorbed portion of the slug of anionic polymer aqueous solution towards the interior of the formation, whereby will be separated the slug of anionic polymer solution already injected and the slug of cationic polymer/cationic or non-ionic microgel suspension to be injected;
   c) injecting a slug of cationic polymer and cationic or non-ionic microgel suspension in a sufficient amount to form a layer of cationic polymer and said cationic or non-ionic microgel adsorbed to the anionic polymer layer already adsorbed to the subterranean formation rock;
   d) injecting a spacer slug of an aqueous brine solution for spacing the polymer slugs and displacement of the slug of cationic polymer/cationic or non-ionic microgel suspension towards the interior of the formation;
   e) if required, repeating the treatment sequence a), b) and c) until the injection pressure of the aqueous solution of step d) attains a value such as to reach the desired value of Residual Resistance Factor to water (RFFw);
   f) shut-in the well during the required period of time to finish the adsorption process among the layers; and
   h) resuming well production.

17. A process according to claim 16, wherein the subterranean oil-bearing formation is a limestone formation.

* * * * *